United States Patent
Rivers et al.

(10) Patent No.: US 7,287,354 B2
(45) Date of Patent: Oct. 30, 2007

(54) VINYL SIDING WIRE CHANNEL

(75) Inventors: Paul Brent Rivers, Cullman, AL (US); Frederick Diggle, III, Birmingham, AL (US)

(73) Assignee: AT&T BLS Intellectual Property Inc., Wilmington, DE (US)

( * ) Notice: Subject to any disclaimer, the term of this patent is extended or adjusted under 35 U.S.C. 154(b) by 277 days.

(21) Appl. No.: 10/806,870

(22) Filed: Mar. 23, 2004

(65) Prior Publication Data

US 2005/0229526 A1 Oct. 20, 2005

(51) Int. Cl.
*E04C 2/54* (2006.01)
*H02G 3/04* (2006.01)
(52) U.S. Cl. .................. 52/220.1; 174/504; 248/67.7
(58) Field of Classification Search ............... 174/480, 174/481, 491, 504, 63, 92; 52/220.1, 220.7, 52/545, 546, 529, 539; 362/152; 248/65, 248/67.7, 71, 49, 58, 62
See application file for complete search history.

(56) References Cited

U.S. PATENT DOCUMENTS

| | | | |
|---|---|---|---|
| 1,772,687 A * | 8/1930 | Reinke | 24/129 R |
| 2,672,314 A * | 3/1954 | Mitchell | 248/301 |
| 3,918,227 A | 11/1975 | Gaaion | |
| 4,189,885 A | 2/1980 | Fritz | |
| 4,339,898 A | 7/1982 | Pichette | |
| D265,969 S * | 8/1982 | Koessler | D8/354 |
| 4,406,438 A | 9/1983 | Bury | |
| 4,435,938 A | 3/1984 | Rutkowski et al. | |
| 4,913,386 A * | 4/1990 | Sugiyama | 248/68.1 |
| 5,141,192 A * | 8/1992 | Adams | 248/231.81 |
| 5,392,579 A | 2/1995 | Champagne | |
| 5,514,834 A * | 5/1996 | Zimmerman | 174/504 |
| 5,537,791 A | 7/1996 | Champagne | |
| D373,948 S * | 9/1996 | Etzel et al. | D8/367 |
| 5,657,585 A | 8/1997 | Zaccagni | |
| 5,823,655 A * | 10/1998 | Brooks | 362/145 |
| 5,829,206 A | 11/1998 | Bachman | |
| 6,158,180 A * | 12/2000 | Edwards | 52/220.7 |
| 6,329,599 B1 * | 12/2001 | Zimmerman | 174/68.3 |
| 6,360,508 B1 | 3/2002 | Pelfrey et al. | |
| D455,065 S * | 4/2002 | Berg | D8/371 |
| 6,904,730 B2 * | 6/2005 | Mitchell | 52/536 |
| 2003/0029205 A1 | 2/2003 | Jurvis | |

* cited by examiner

*Primary Examiner*—Lanna Mai
*Assistant Examiner*—Christine T. Cajilig
(74) *Attorney, Agent, or Firm*—Scott P. Zimmerman, PLLC; Geoff Sutcliffe; Jodi Hartman (57) ABSTRACT

An apparatus and methods of use for a wire channel device that is positioned between an upper siding panel and a lower siding panel along the side of a building and that routes, supports, and/or secures one or more wires. The wire channel device includes an upwardly extending arm, a transverse leg, and a wire channel having a downwardly extending leg, a channel portion, and a rear upwardly extending leg.

10 Claims, 9 Drawing Sheets

VINYL SIDING WIRE CHANNEL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to wire channel device that is easily attached to the siding on an exterior of a building and that supports one or more wires within an interior channel.

2. Description of the Related Art

In the telecommunications or electronics industry, it is common practice for a technician to route wires along an outside wall of a building, such as a home or business. Conventional practice provides several approaches that involve either using a cable clip, using a clamp with a screw, and stapling the wire to the siding. However, each of these approaches has drawbacks. Moreover, all of these approaches leave the wire exposed to ambient environmental conditions, such as, for example, ozone, wind, precipitation, wildlife, and others.

Using the cable clip is problematic because this approach is limited to the clip supporting one wire at one spot. If multiple wires are run, then the technician has to install more clips and space them apart. This approach can be time consuming and can create an eye sore on the side of the house.

Using the clamp and screw is problematic because this approach is very time consuming and creates even more of an eye sore than the use of the cable clip. When the clamp and screw are used, they are initially attached to the siding, the wire is placed under then clamp, and finally the clamp is tightened down. If more than one wire is routed in the clamp and screw, then the wires frequently get pinched which may cause electrical shorts.

Stapling the wire to the wall is problematic because older siding frequently splits, cracks, and/or breaks when subjected to the staple impact. And similar to the embodiments above, if multiple wires are run, the technician frequently must route and staple each wire independently.

Accordingly, what is needed is a device to overcome the above and/or other shortcomings of the conventional approaches.

SUMMARY OF THE INVENTION

This invention addresses the above-described needs, and other needs, by providing an easy to install wire channel device that supports one or more wires within an interior channel. According to embodiments of this invention, the wire channel device provides an aesthetically-pleasing system for routing, supporting, and securing one or more wires along a side wall(s) of a home or business that is covered in siding panels, such as aluminum siding, vinyl siding, and other siding. The wire channel device may be designed with an exterior surface to match the mated siding panel. For example, if the siding of the home is white-colored vinyl, then a portion of the exterior surface of the wire channel device is composed of a complimentary material to match and/or to compliment the white-colored vinyl. According to further embodiments, the wire channel device is easy to install and is secured between an upper siding panel and a lower siding panel. The wire channel device may have a variety of lengths, widths, heights, and other dimensions so that the wire channel device may fit with a variety of siding types. Further embodiments disclose that the wire channel device may be manufactured in a plurality of sections that are aligned and mated together to extend the entire length or a partial length of the side wall(s). The wire channel device of this invention may be made of a variety of materials, such as, for example, metal, polymer, plastic, paper, cloth, ceramic, glass, and/or crystal.

In embodiments of this invention, the wire channel device includes an upwardly extending arm, a transverse leg, and a wire channel. The upwardly extending arm includes a top portion, a bottom portion, an inner surface, and an outer surface. The outer surface of the top portion of the arm includes at least one projection to engage and to secure the wire channel device between an upper siding panel and a lower siding panel. For example, the projection may be a triangular shaped lip that is wedged between a bottom lip of the bottom siding panel and between an upper hook of the top siding panel. Alternatively, the projection may take on alternate shapes such as a bent lip or a bent extension of the arm. The transverse leg extends outward from the outer surface of the bottom portion of the arm towards a downwardly extending leg of a wire channel. Typically, the transverse leg extends at approximately a right angle (i.e., approximately 90°) from the outer surface of the bottom portion of the arm such that the transverse leg is substantially parallel to a bottom surface of the bottom siding panel. Further, the wire channel includes the downwardly extending leg, a channel portion, and a rear upwardly extending leg. The downwardly extending leg is longer than the rear upwardly extending leg such that an open passageway is formed between an end portion of the rear upwardly extending leg and the transverse leg, and, a wire my pass through this open passageway to an interior channel of the channel portion. Thus, the interior channel supports and secures the wire and helps to protect the wire from wildlife and environmental risks. According to various embodiments, the wire channel may take on a variety of shapes, such as, for example, a "U"-shape, a "V"-shape, a rectangular shape, polygonal shapes, and non-polygonal shapes.

In other embodiments, a wire channel device includes a transverse leg extending outwardly towards a downwardly extending leg of a wire channel and the wire channel. Similar to the above embodiments, the transverse leg extends beneath a rearward-facing hook portion of an upper siding panel and the wire channel includes the downwardly extending leg, a channel portion, and a rear upwardly extending leg. However, in these embodiments, the upwardly extending arm(s) may not be a component of the wire channel device, rather, the transverse leg and the channel portion would include at least one male projection on one side and at least one female repository on the other side such that this wire channel device could mate with another wire channel device that includes the arm. Alternatively, the upwardly extending arm may be attached to an end portion of the transverse arm. Still, other alternatives provide that the wire channel device may include a plurality of upwardly extending arms that are positioned along different end portions of the transverse arm. That is, for example, there may be an arm at each end of the wire channel device and there may be a third arm in a middle of the wire channel device.

Further details on these embodiments and other possible embodiments including methods for using the wire channel device assembly are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, in which.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalent as those shown herein.

This invention is directed to a wire channel device that attaches to siding panels of a home or a business and that supports one or more wires within an interior channel. According to embodiments of this invention, the wire channel device provides an attractive channel for routing, supporting, and securing one or more wires along a side wall(s) of a home or business that is covered in siding panels, such as aluminum siding, vinyl siding, and other siding type panels. The wire channel device may be designed with an exterior surface to match the mated siding panel. For example, if the siding of the home is white-colored vinyl, then the wire channel device is composed of a complimentary material to match and/or to compliment (e.g., a trim color, a shutter color, and/or a complimentary composite material) the white-colored vinyl. According to further embodiments, the wire channel device is easy to install and is secured between an upper siding panel and a lower siding panel. The wire channel device may have a variety of lengths, widths, heights, and other dimensions, and other embodiments disclose that the wire channel device may be manufactured in a plurality of sections that are aligned and mated together to extend the entire length or a partial length of the side wall(s). Still further, this invention includes methods for positioning a wire channel device to engage an upper and a lower siding panel and/or for supporting a wire within the wire channel.

Figure 1:
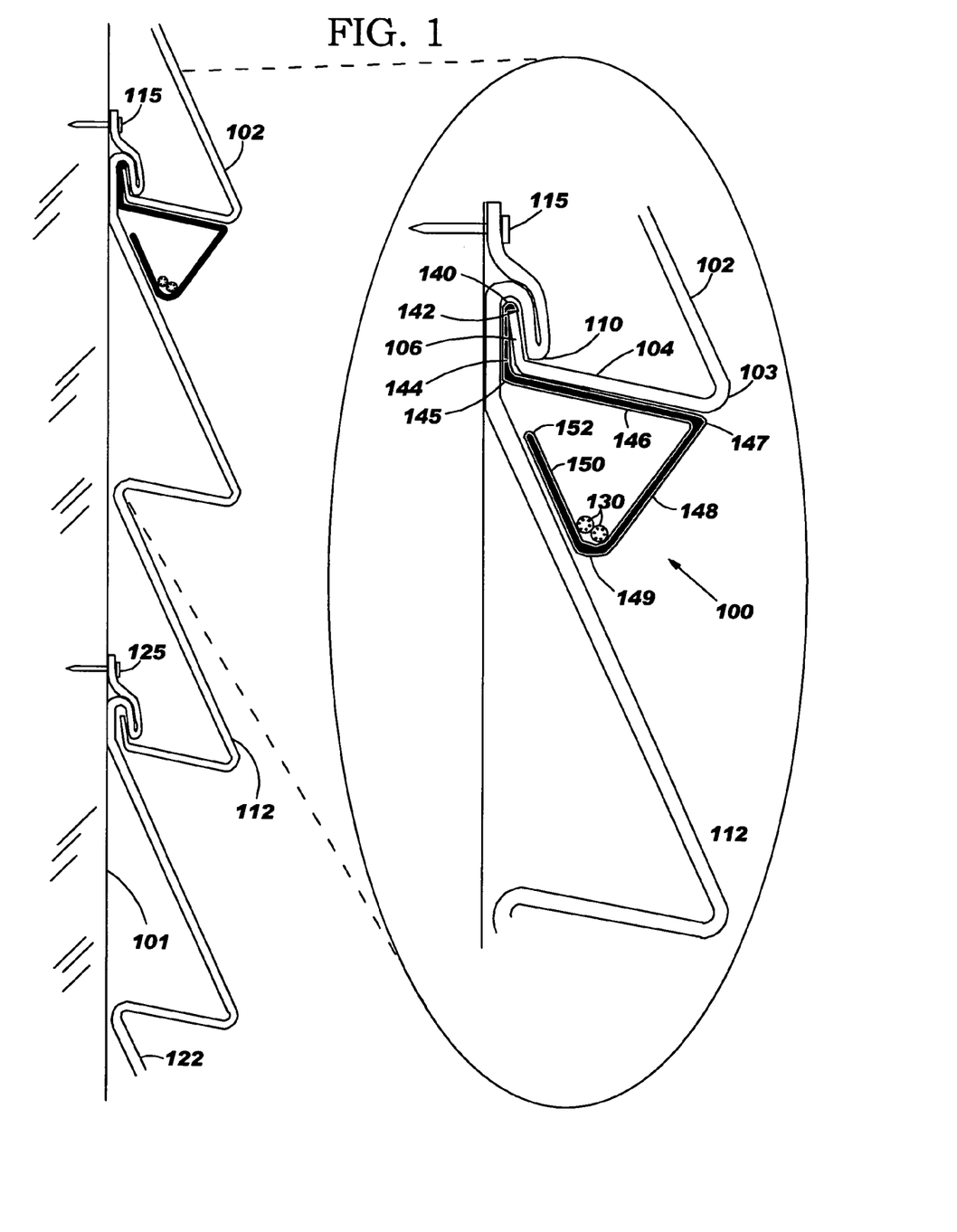
FIG. 1 is a perspective side view of a wire channel device positioned between an upper siding panel and a lower siding panel according to embodiments of this invention.

FIG. 1 illustrates a perspective side view of a wire channel device 100 positioned between an upper siding panel 102 and a lower siding panel 112 according to embodiments of this invention. The upper siding panel 102 illustrates a detailed bottom portion having an elbow 103, a rearward facing hook portion 104 and a lip portion 106. The lower siding panel 112 illustrates a detailed top portion having complimentary hooked portion 110 mated with the bottom portion of the upper siding panel 102. The lower siding panel 112 further illustrates the conventional practice of using a nail 115 to affix the lower siding panel 112 to a side 101 of a building (shown as reference 200 in FIG. 2).

Figure 2:
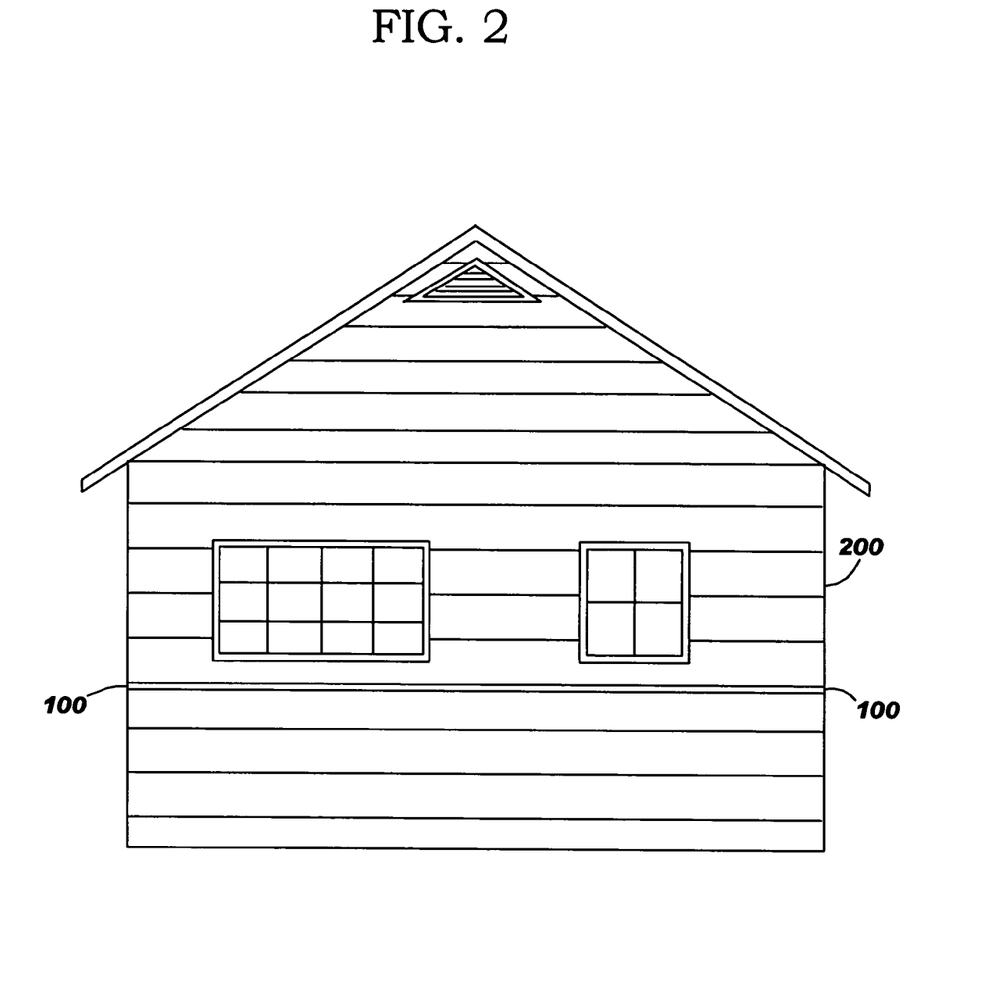
FIG. 2 is a perspective front view of the wire channel device of FIG. 1 extending along a side of a building according to embodiments of this invention.

Typically, the wire channel device 100 is used as generally shown in FIGS. 1 and 2. When routing one or more wires 130, a technician affixes the wire channel device 100 along a side of a building 200 between an upper siding panel 102 and a lower siding panel 112. Thereafter, the technician pushes the wire(s) 130 into an open passageway 153 to an interior of the wire channel 151. Thus, the wire is routed, supported, and/or protected from environmental conditions and wildlife in an aesthetically pleasing wire channel device 100. Examples of routing wires include, but are not limited to installation, maintenance, testing, and/or other types of repair work on hardware and equipment used by the telecommunications and/or electrical industry. Still further, this invention includes a method of positioning the wire channel device 100 and/or a method of routing, supporting, and/or protecting one or more wires that extend within the wire channel device 100 along the side 101 of the building 200.

Figure 3A:
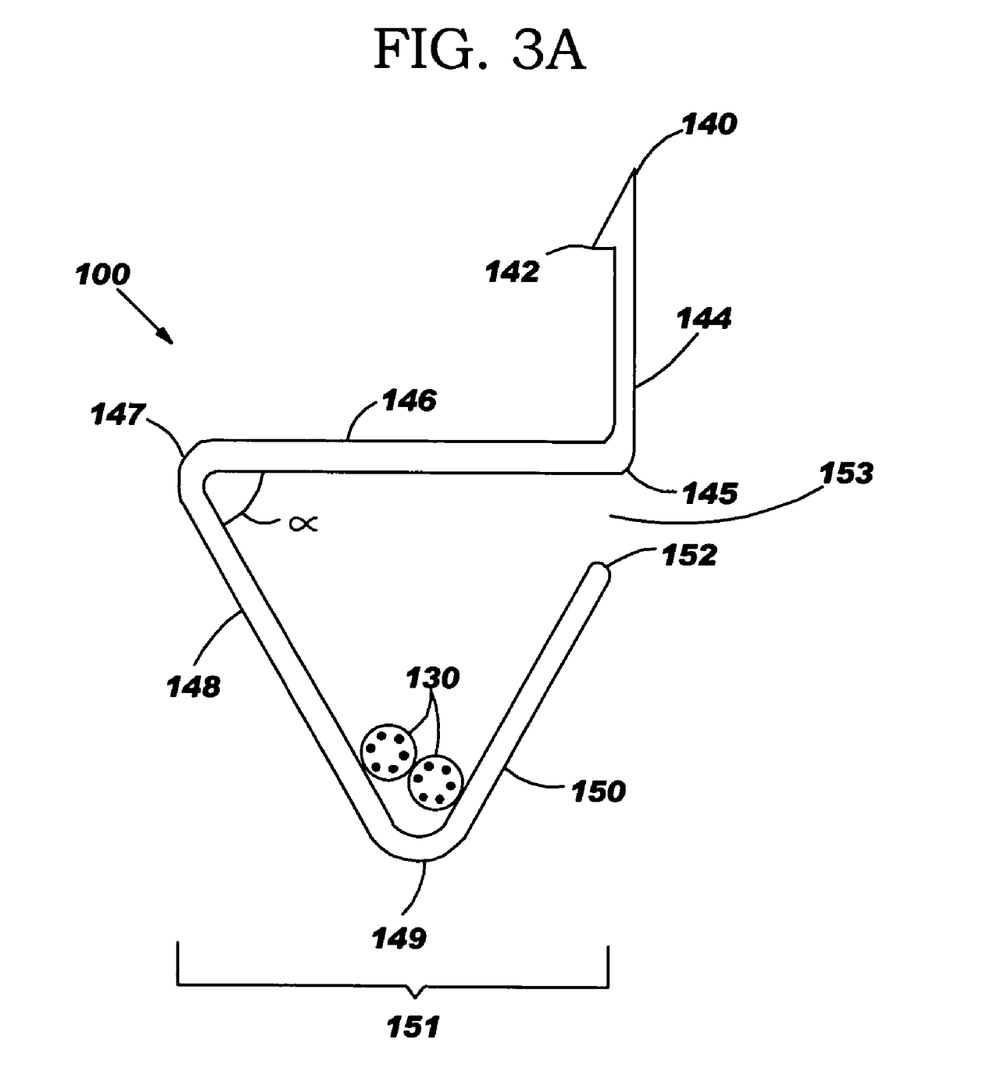
FIG. 3A is another perspective side view of the wire channel device of FIG. 1.
Figure 3B:
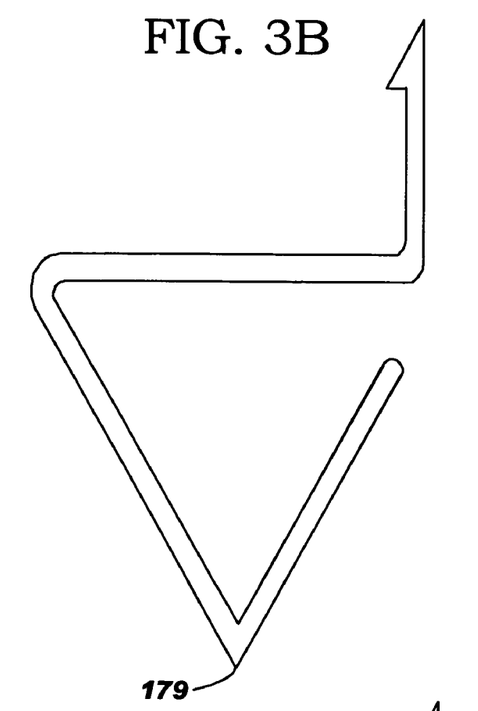
FIGS. 3B and 3C are perspective side views of other wire channel devices having alternate wire channel shapes according to embodiments of this invention.
Figure 3C:
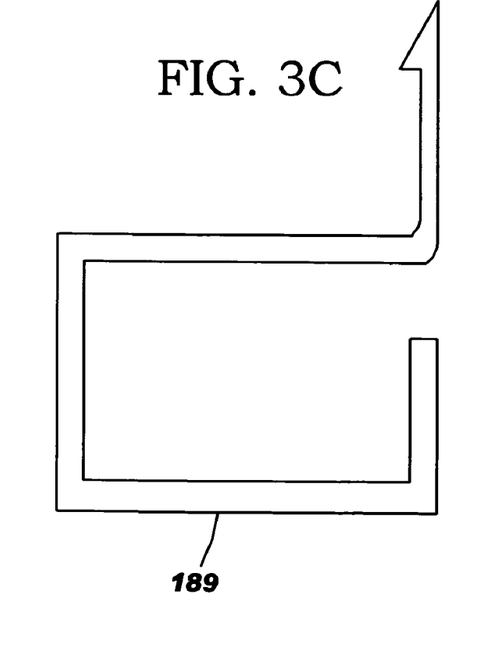

As illustrated in the perspective side views of the wire channel device 100 of FIGS. 1 and 3, the wire channel device 100 includes an upwardly extending arm 144, a transverse leg 146, and a wire channel 151 having a downwardly extending leg 148, a hooking or channel portion 149, and a rear upwardly extending leg 150. The upwardly extending arm 144 includes a top portion 140, a bottom elbow portion 145, an inner surface, and an outer surface . The outer surface of the top portion 140 includes a projection having a triangular-shaped lip 142. As shown in FIG. 1, upwardly extending arm 144 extends along a complementary surface of the complimentary hooked portion 110 of the lower siding panel 112 and the triangular-shaped lip 142 extends over the lip portion 106 of the upper siding panel 102 such that the triangular-shaped lip 142 engages or "catches" the lip portion 106 of the upper siding panel 102. The transverse leg 146 has a width that is approximate to a width of the rearward facing hook portion 104 of the upper siding panel 102 such that the transverse leg 146 runs substantially parallel to a bottom surface of the rearward facing hook portion 104. The transverse leg 146 downwardly bends at a second outer elbow 147 to form the downwardly extending leg 148 that extends at an angle α towards the arm 144. According to embodiments of this invention the angle α may be from approximately fifteen degrees to seventy five degrees, and in the illustrated embodiments, the angle α is shown at least about fifty degrees. The downwardly extending leg 148 bends at the channel portion 149 up towards the arm 144 to form the rear upward extending leg 150, The rear upward extending leg 150 is shorter than the downwardly extending leg 148, providing an open passageway 153 between an end of the rear upward extending leg 150 and the transverse leg 146 such that one or more wires 130 can pass through the open passageway 153 to an interior of the wire channel 151. According to the illustrated embodiments of FIGS. 1 and 3, the channel portion 149 is rounded or "U"-shaped so that a wire 130 is not pinched by a sharp interior angle. According to alternate embodiments, the wire channel portion 149 may be other shapes, such as, for example, a "V"-shape, a rectangular shape, a polygonal shape, and a non-polygonal shape.

Figure 4:
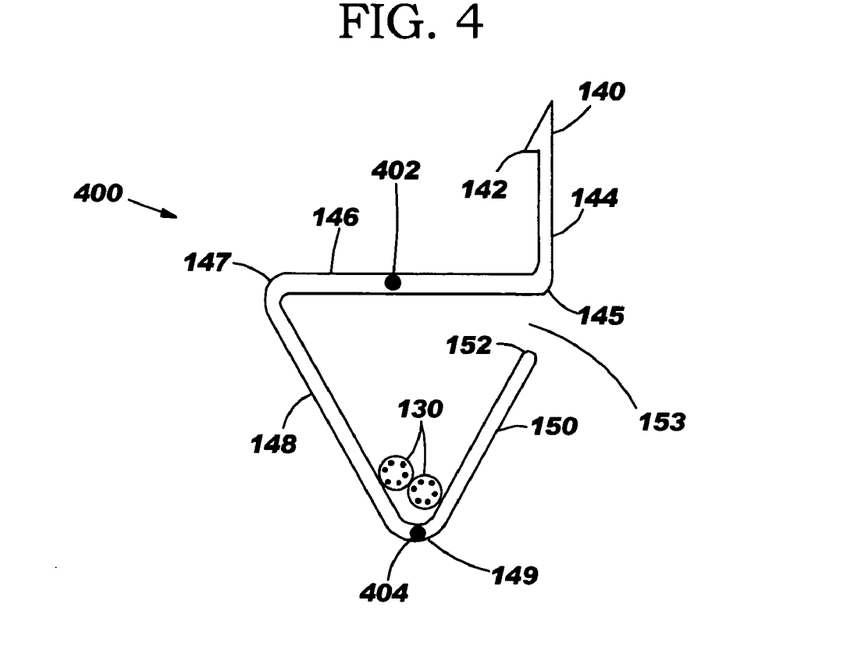
FIG. 4 illustrates a perspective side view of an alternate wire channel device according to embodiments of this invention.
Figure 5:
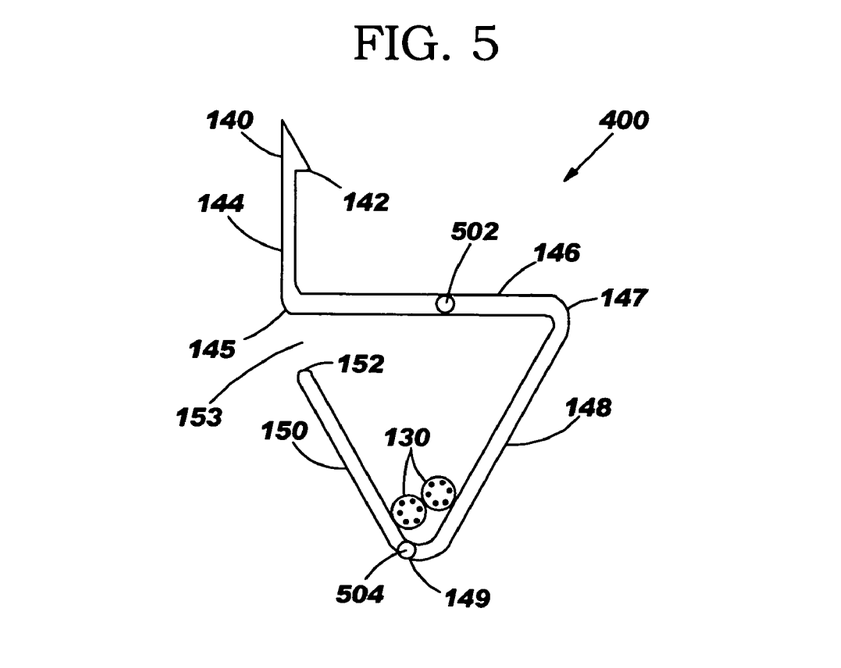
FIG. 5 illustrates a perspective view of the other side of the wire channel device of FIG. 4.

FIG. 4 is a side perspective view of a wire channel device 400 similar to the wire channel device 100 of FIG. 1; however, the wire channel device 400 further includes a male projection 402 on a lateral side of the transverse leg 146 and a male projection 404 on the same lateral side of the wire channel portion 151. FIG. 5 is the other side perspective view of the wire channel device 400 of FIG. 4 that illustrates a female repository 502 in a lateral side of the transverse leg 146 and a female repository 504 in the same lateral side of the wire channel portion 151. The male projections 402, 404 are designed to mate with the female repositories 502, 504 such that the male projections 402, 404 of a first wire channel device snap fit into alignment with the female repositories 502, 504 of a second wire channel device to secure the first wire channel device with the second wire channel device and provide a continuous wire channel portion of the first and second wire channel devices for a continuous route, support, and/or protection for the one or more wires 130. Similar to the embodiments illustrated in FIG. 2, the mated, first and second wire channel devices (and, if necessary, additional mated wire channel devices in a series arrangement) extend along the length of a building 200 to provide an attractive alternative for concealing, supporting, and/or protecting one or more wires that are routed about the exterior of the building 200.

Figure 6:
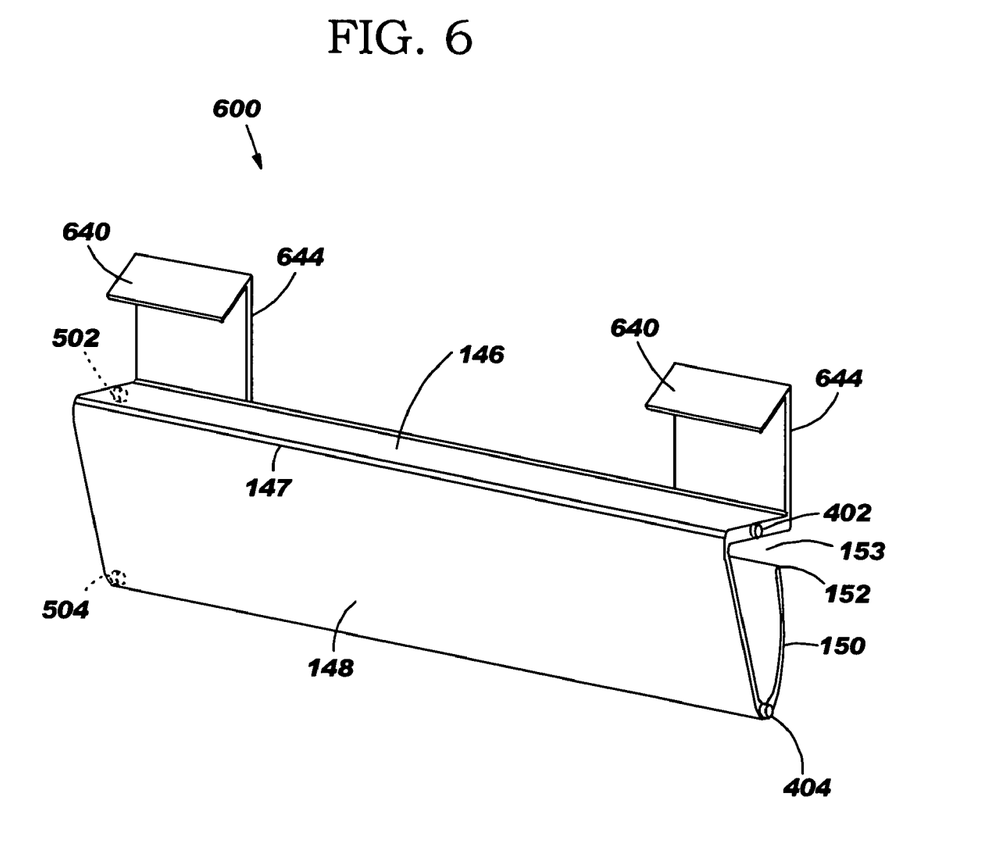
FIG. 6 is a perspective front view of another wire channel device according to embodiments of this invention.

FIG. 6 shows a perspective front view of a wire channel device 600 similar to the wire channel device 400 of FIGS. 4-5. FIG. 6 shows the wire channel device 600 may be extruded as a long, continuous member having a cross-section similar to the cross sections shown in FIGS. 1 and 3-5. Here, however, the wire channel device 600 includes a pair of upwardly extending arms 644, each arm 644 having a bent, flat lip 640. The flat lip 640 has an interior angle relative to transverse arm 146 of at least approximately fifteen degrees. These upwardly extending arms 644 may be made of the same material as the upwardly extending arm 144 and lip 142, the transverse arm 146, and/or the wire channel 151 of FIG. 1. Alternatively, these arms 644 may be made of an alternate material, such as, for example, a more pliable or thinner material that easily and flexibly fits between the upper siding panel 102 and the lower siding panel 122. If these arms 644 are made of an alternate material, they would connect via attachment means (not shown) to the transverse arm 146 and could be positioned and attached at any location along the length of the transverse arm 146.

Figure 7:
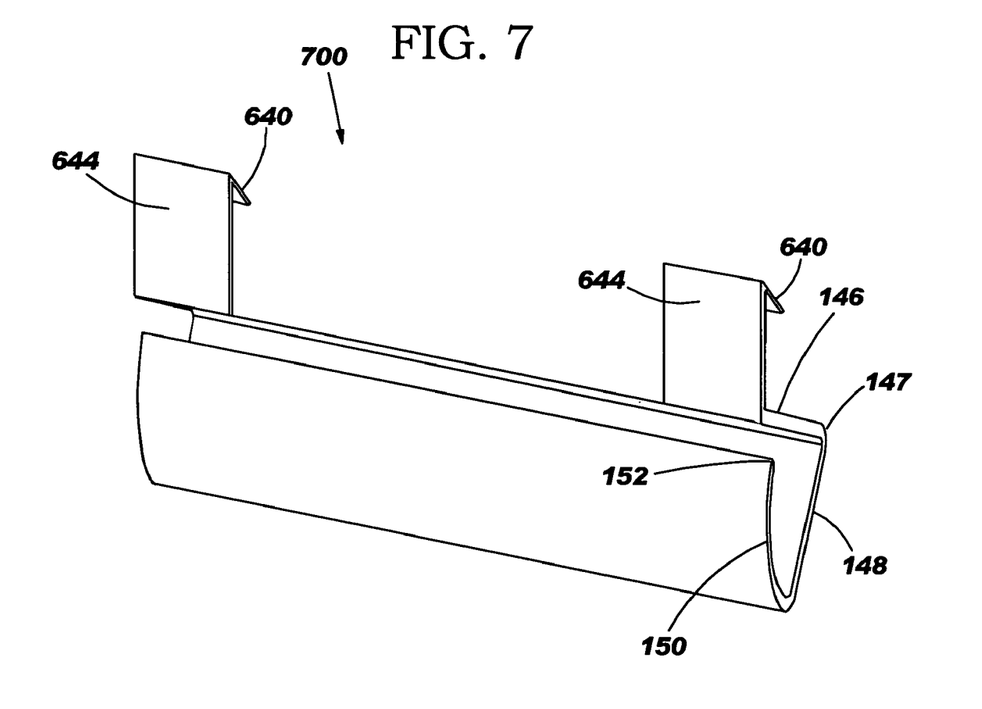
FIG. 7 illustrates a perspective rear view of another wire channel device according to embodiments of this invention.
Figure 8A:
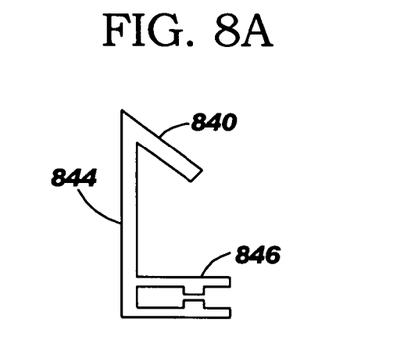
FIGS. 8A and 8B respectively illustrate a perspective side view of an attachable wire channel arm and a rear perspective view of the wire channel device 600 of FIG. 6 with the attachable wire channel arm attached to the transverse leg according to embodiments of this invention.
Figure 8B:
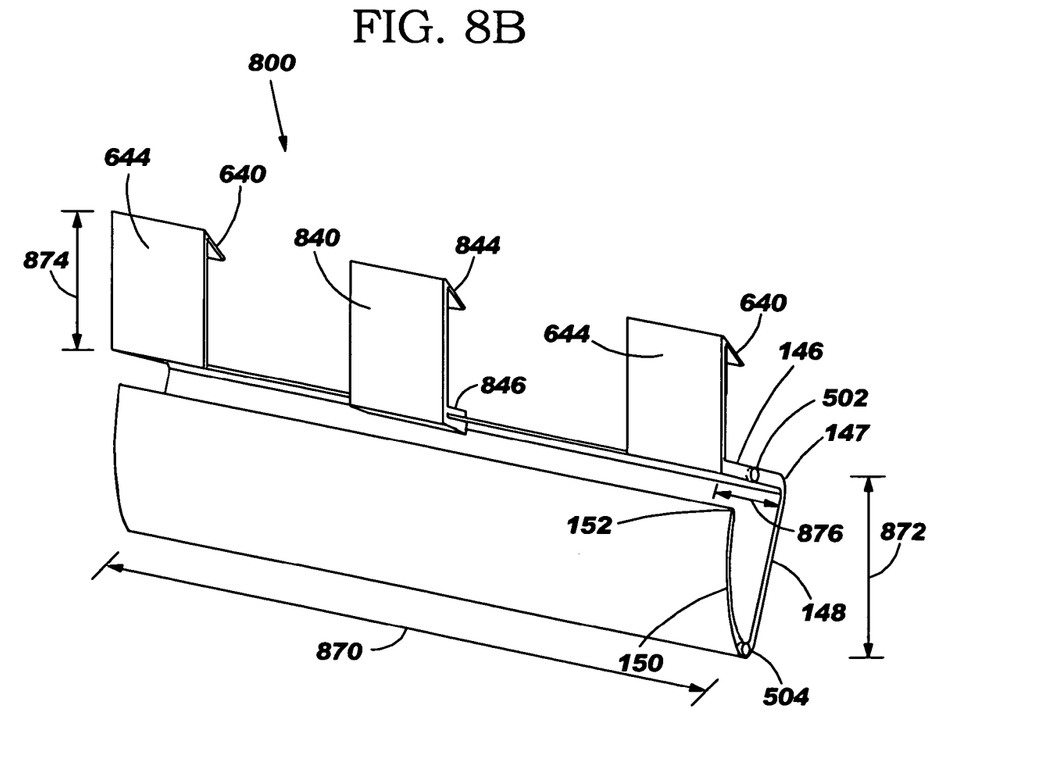
Figure 9:
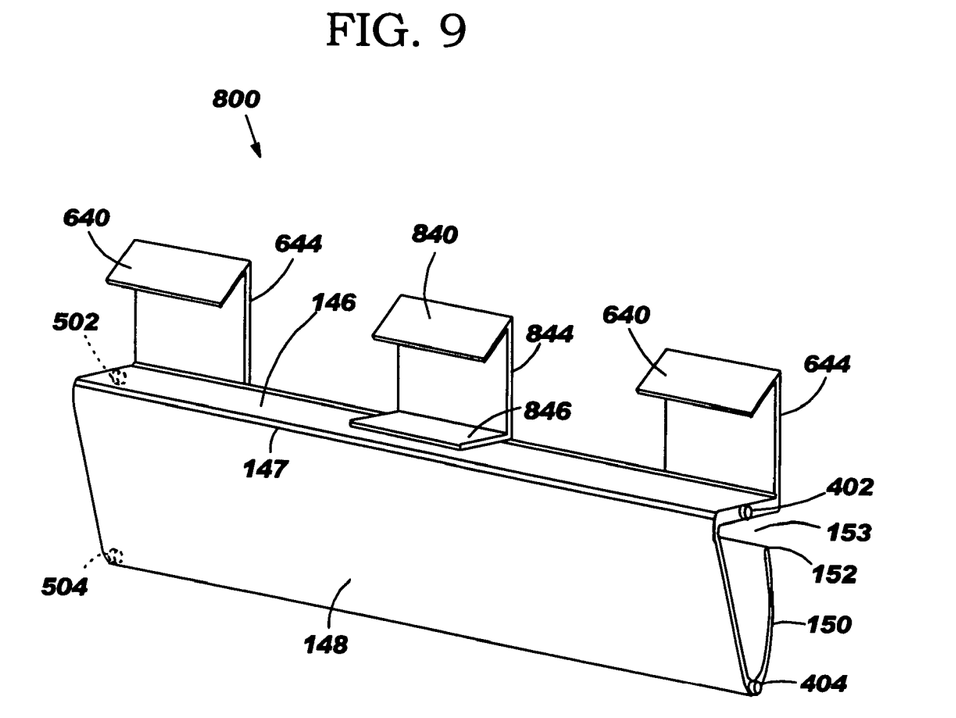
FIG. 9 illustrates a perspective front view of the wire channel device of FIG. 8B.

Variations of the above embodiments include the illustrations shown in FIGS. 7, 8A, 8B, and 9. FIG. 7 shows a perspective rear view of a wire channel device 700 similar to the wire channel device 600 of FIG. 6. However, the wire channel device 700 of FIG. 7 does not include the male projections 402, 404 or the female repositories 502, 504 along the lateral sides of the wire channel device 700. FIGS. 8A and 8B illustrate yet further embodiments of this invention. FIG. 8A illustrates a perspective side view of a third, attachable upwardly extending arm 844 having a bent, flat lip 840 and having attachment means 846 to attach the upwardly extending arm 844 to a portion of the transverse arm 146. FIG. 8B illustrates a perspective rear view of the third arm 844 attached to a wire channel device 800 similar to the wire channel device 700 of FIG. 7 and FIG. 9 illustrates a perspective front view of the third arm 844 attached to the wire channel device 800. By including this third arm 844, the wire channel device 800 may be able to support heavier wires 130 or may provide better security from environmental risks, such as higher wind speeds.

According to embodiments of this invention, the wire channel device 800 has a length 870 of approximately twelve (12) inches, a channel height 872 of at least about one and a half (1½) inches, an arm height 874 of at least about one (1) inch, and a transverse arm 876 width of at least about one (1) inch. Alternatively, as one of ordinary skill in the art appreciates, these measurements may vary so long as the wire channel device fits between the first panel 102 and the second panel 112 to support one or more wires 130 as herein described. Still according to further embodiments, the wire channel device may be made of any type of material, such as a plastic, polymer, and/or metal. If a metal component is used for the wire channel device, then that component may also have a durable finish coating, such as polyurethane powder. Alternatively, the wire channel device wire channel device could be constructed of other suitable materials that can withstand a wide range of temperatures, humidity, moisture, and other environmental and wildlife conditions. For example, the wire channel device may include composite, ceramic, glass, crystal, and/or other materials and combination capable of being used as herein described.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

What is claimed is:

1. A wire channel device for use with an upper siding panel and a lower siding panel, comprising:

an upwardly extending arm having a top portion, a bottom portion, an inner surface, and an outer surface, the outer surface of the top portion having a bent flat lip wedged between a bottom lip of an upper siding panel and between an upper hook of a lower siding panel;

a transverse leg outwardly extending from the outer surface of the bottom portion of the arm towards a downwardly extending leg of the wire channel, the transverse leg extending at a right angle from the outer surface of the bottom portion of the arm and the transverse leg having a width that is the same as a width of a lower hook of the upper siding panel, such that the transverse leg is parallel to a bottom surface of the upper siding panel;

the wire channel having the downwardly extending leg, a channel portion, and a rear upwardly extending leg, the downwardly extending leg having a longer length than the rear upwardly extending leg such that an open passageway is formed between an end portion of the rear upwardly extending leg and the transverse leg, thus creating the open passageway through which a wire may pass into an interior channel of the channel portion;

a pair of upwardly extending arms with each arm having said bent, flat lip, the flat lip having an interior angle relative to the outer surface of the arm of fifteen degrees; and an exterior surface matching the upper siding panel and the lower siding panel, the wire channel device having a plurality of sections mated and aligned together, wherein the interior channel supports and secures the wire and helps to protect the wire from wildlife and environmental risks.

2. The wire channel device of claim 1, wherein the channel portion comprises a substantially "U"-shaped channel.

3. The wire channel device of claim 1, wherein the channel portion comprises a substantially "V"-shaped channel.

4. The wire channel device of claim 1, the transverse leg further comprising a first lateral side and a second lateral side, the first lateral side having a female repository and the second lateral side having a male projection, wherein the male projection of a first wire channel section mates with the female repository of a second wire channel section such that first wire channel section snap fits into alignment and secures with the second wire channel section.

5. The wire channel device of claim 1, the downwardly extending leg further comprising a first lateral side and a second lateral side, the first lateral side having a female repository and the second lateral side having a male projection, wherein the male projection of a first wire channel section mates with the female repository of a second wire channel section to align and secure the first wire channel section with the second wire channel section.

6. The wire channel device of claim 1, wherein a length of the upwardly extending arm comprises at least about one inch.

7. The wire channel device of claim 1, wherein a length of the transverse leg comprises at least one inch.

8. The wire channel device of claim 1, wherein the downwardly extending leg comprises at least one and a half inches.

9. The wire channel device of claim 1, wherein the downwardly extending leg extends downward at an angle of at least thirty degrees toward the transverse leg.

10. The wire channel device of claim 1, wherein a material of the wire channel device is selected from the group consisting of:

metal, polymer, plastic, vinyl, ceramic, composite, glass, and crystal.

* * * * *